US011962693B2

United States Patent
Lu et al.

(10) Patent No.: US 11,962,693 B2
(45) Date of Patent: *Apr. 16, 2024

(54) INTEGRATED CIRCUIT (IC) SIGNATURES WITH RANDOM NUMBER GENERATOR AND ONE-TIME PROGRAMMABLE DEVICE

(71) Applicant: Taiwan Semiconductor Manufacturing Company, Ltd., Hsinchu (TW)

(72) Inventors: Shih-Lien Linus Lu, Hsinchu (TW); Kun-hsi Li, Hsinchu (TW); Shih-Liang Wang, Hsinchu (TW); Jonathan Tsung-Yung Chang, Hsinchu (TW); Yu-Der Chih, Hsinchu (TW); Cheng-En Lee, Hsinchu (TW)

(73) Assignee: Taiwan Semiconductor Manufacturing Company, Ltd., Hsinchu (TW)

(*) Notice: Subject to any disclaimer, the term of this patent is extended or adjusted under 35 U.S.C. 154(b) by 0 days.

This patent is subject to a terminal disclaimer.

(21) Appl. No.: 18/064,098

(22) Filed: Dec. 9, 2022

(65) Prior Publication Data
US 2023/0121502 A1 Apr. 20, 2023

Related U.S. Application Data

(63) Continuation of application No. 17/106,856, filed on Nov. 30, 2020, now Pat. No. 11,528,135.
(Continued)

(51) Int. Cl.
*H04L 9/08* (2006.01)
*G06F 7/58* (2006.01)
*H04L 9/32* (2006.01)

(52) U.S. Cl.
CPC ............ *H04L 9/0869* (2013.01); *G06F 7/584* (2013.01); *H04L 9/0877* (2013.01);
(Continued)

(58) Field of Classification Search
CPC ... H04L 9/0869; H04L 9/0877; H04L 9/0897; H04L 9/3278; H04L 9/0866; H04L 2209/08; G06F 7/584
See application file for complete search history.

(56) References Cited

U.S. PATENT DOCUMENTS

2008/0025506 A1* 1/2008 Muraoka ............ G06F 12/1408
380/46
2016/0154744 A1 6/2016 Zheng et al.
(Continued)

FOREIGN PATENT DOCUMENTS

CN 1808966 B 4/2010
CN 102117387 B 3/2016
(Continued)

OTHER PUBLICATIONS

Chinese Office Action for Application No. 202110337813.X mailed Oct. 31, 2023.

*Primary Examiner* — Philip J Chea
*Assistant Examiner* — Sangseok Park
(74) *Attorney, Agent, or Firm* — Merchant & Gould P.C.

(57) ABSTRACT

Systems and methods of generating a security key for an integrated circuit device include generating a plurality of key bits with a physically unclonable function (PUF) device. The PUF can include a random number generator that can create random bits. The random bits may be stored in a nonvolatile memory. The number of random bits stored in the nonvolatile memory allows for a plurality of challenge and response interactions to obtain a plurality of security keys from the PUF.

20 Claims, 9 Drawing Sheets

Related U.S. Application Data

(60) Provisional application No. 63/002,676, filed on Mar. 31, 2020.

(52) U.S. Cl.
CPC .......... *H04L 9/0897* (2013.01); *H04L 9/3278* (2013.01); *H04L 2209/08* (2013.01)

(56) References Cited

U.S. PATENT DOCUMENTS

| | | | | |
|---|---|---|---|---|
| 2019/0147967 A1* | 5/2019 | Tuyls | ...................... | G11C 17/18 365/96 |
| 2020/0150929 A1* | 5/2020 | Cambou | .................. | G06F 7/588 |
| 2020/0186339 A1* | 6/2020 | Hung | ....................... | G06F 3/068 |

FOREIGN PATENT DOCUMENTS

| | | |
|---|---|---|
| CN | 105894268 A | 8/2016 |
| CN | 106845975 A | 6/2017 |
| CN | 107924448 A | 4/2018 |
| TW | 200509636 A | 3/2005 |
| TW | 200830832 A | 7/2008 |

\* cited by examiner

INTEGRATED CIRCUIT (IC) SIGNATURES WITH RANDOM NUMBER GENERATOR AND ONE-TIME PROGRAMMABLE DEVICE

CROSS-REFERENCE TO RELATED APPLICATION

This application claims the benefit of U.S. patent application Ser. No. 17/106,856 filed on Nov. 30, 2020, now U.S. Pat. No. 11,528,135, which claims priority from U.S. Provisional Patent Application No. 63/002,670, entitled "PHYSICAL UNCLONABLE FUNCTION (PUF) USING ONE-TIME PROGRAMMABLE DEVICE (OTP)," filed on Mar. 31, 2020, which is incorporated herein by reference in its entirety for all that it teaches and for all purposes.

BACKGROUND

As reliance on computer systems and the internet increases in many areas such as personal communications, shopping, banking, commerce, etc., the need for improved cyber security also increases. Many security measures may be employed, including cryptography. A physical unclonable function (PUF) is a physical object embodied in a physical structure that can be used to produce an output. The output is easy to evaluate but the output is very hard or nearly impossible to predict. A PUF output can be used as a unique identification or key in secure computing and communication.

An individual PUF device must be easy to make but practically impossible to duplicate, even given the exact manufacturing process that produced it. In this respect it is the hardware analog of a one-way function. PUFs are typically implemented in integrated circuits and are typically used in applications with high security requirements.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
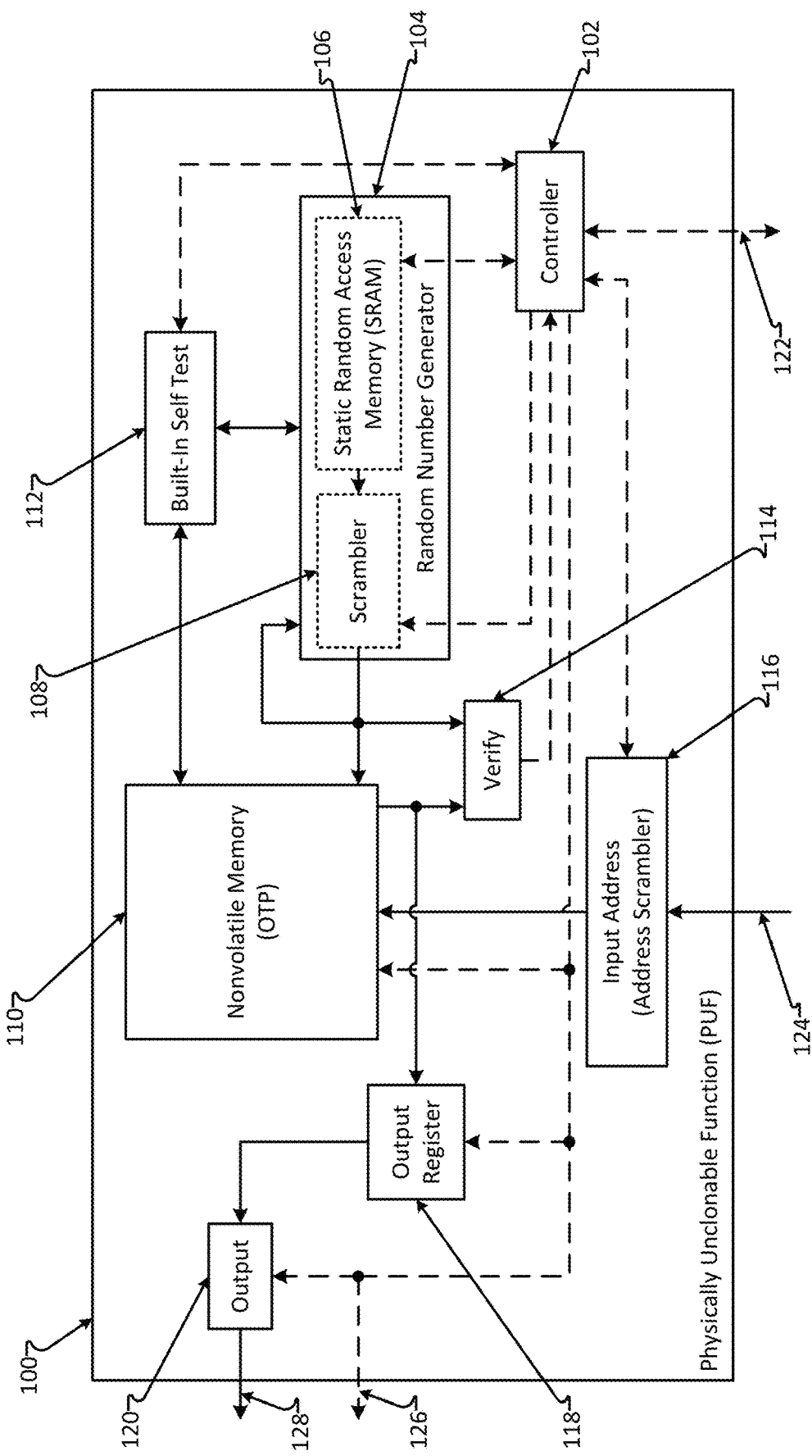
FIG. 1 is a block diagram illustrating aspects of an example physically unclonable function (PUF) generator/device in accordance with examples of the present application.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include examples in which the first and second features are formed in direct contact, and may also include examples in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various examples and/or configurations discussed.

As noted above, a physical unclonable function (PUF) is a physical object embodied in a physical structure that can be used to produce an output that is easy to evaluate but nearly impossible to predict. Integrated circuit (IC) devices generally include electronic circuits formed on a semiconductor substrate, or "chip," formed of a semiconductor material such as silicon. Components of IC devices are formed on the substrate by a photolithography process rather than being constructed one item at a time. The electronic devices formed on the substrate are interconnected by conductors, or wires, also formed on the substrate by photolithographic processes. Although manufactured in high volume, each IC device is unique due to physical randomness, even with the same manufacturing processes materials. This inherent variation can be extracted and used as its unique identification, as DNA to human beings. In accordance with examples disclosed herein, such variation is used to create a unique IC device signature used as a PUF, since it is unique, inherent to the particular device, unclonable (cannot be mimicked or duplicated), repeatable, etc.

FIG. 1 is a block diagram illustrating an example of an integrated circuit device, which can include a PUF device/generator 100, in accordance with aspects of the present disclosure. The integrated circuit device includes a substrate that forms the electronic device, which could be any of various types of devices implemented by an integrated circuit, such as a processing or memory device. The PUF device 100 is configured to receive a challenge via an input port 116. In response to the challenge, the authentication circuit is configured to provide a response in the form of a security key, which is output by the PUF circuit 100 via an output port 120. As noted above, a PUF 100 is constructed based on the occurrence of different physical process variations during the manufacturing of an IC. These static physical variations allow an IC to have a unique fingerprint (or multiple unique fingerprints) particular to the IC. When a particular challenge is received via the input port 116, a corresponding unique response is generated. An IC that is capable of generating multiple fingerprints is a strong PUF, since multiple challenge and response pairs are available.

With some PUF generation techniques, some potential security key bits may vary from one PUF generation to another. In this disclosure, such key bits are referred to as random bits. In general, these random bits are not suitable to be used for key generation because messages encrypted with a key having random bits may not be deciphered reliably. Useful bits are collected and identified to generate a unique and reliable key per IC device. In some examples disclosed herein, rather than keeping a record of key bits for use in generating security keys, scrambled random bits are maintained. In the example shown in FIG. 1, a scrambled version of the random bits are stored in the nonvolatile memory 110. Generating the security key includes accessing the memory 110, and then outputting a response key.

A PUF device 100 is configured to generate a security key that includes a predefined number of key bits. As noted above, the security key is provided in response to a received challenge, and is unique to the particular IC device 100 due to inherent variations resulting from the manufacturing process for the device. In some examples, the PUF device 100 includes a random number generator 104, for example, a memory array, such as an SRAM memory array, where the memory cells of the array generate key bits of the security key. The size of the SRAM array or number of memory cells of the SRAM array used for key generation may be determined based on the size of the required security key(s).

Processing memory 110 is provided for PUF data processing. In the illustrated example, the processing memory 110 is nonvolatile memory (NVM). In some examples, the processing memory 110 is a One-Time Programmable (OTP) memory or device. Hereinafter, the processing memory 110 may be interchangeably referred to as NVM 110 or OTP 110, but, however, it should be noted that the processing memory 110 is not limited to nonvolatile memories or to OTP memories or devices.

A request 124 for a security key is received in the form of a challenge. An input address block 116 handles such a request, or challenge, to ensure correctness of the challenge before presenting the challenge to the processing memory 110. Based on a valid response, a security key is retrieved by the processing memory 110. In some examples, the input address block 116 processes the response by scrambling the input address to randomize the request for the security key sent to the processing memory 110.

In the example circuit shown in FIG. 1, the memory to store the scrambled bits comprises a nonvolatile memory provided on the PUF device 100 itself. In other examples, the memory is located external to the PUF device 100. In FIG. 1, the memory is an anti-fuse OTP 110, which marks the address(es) of identified, scrambled random bits in the PUF 100. As will be discussed further below, initially OTP 110 contains no information. During a commissioning process, the OTP 110 is updated with scrambled bits and addresses at the end of each of a plurality of steps. At the end of all the steps, the OTP 110 will contain information about all scrambled bits. This information is used by the PUF 100 to generate the security key in response to a received challenge. The illustrated example further includes a controller 102. In examples where the NVM 110 is implemented via the OTP 110, the controller 102 interfaces with the OTP 110 for read and write modes.

The illustrated authentication circuit 100 further includes an input address block 116, which provides an interface external to the PUF device 100. For example, the input address block 116 initiates access to the PUF device 100 and keeps track of all transactions related to the OTP 110 access and data collection.

A PUF device 100 obtains the inherent differences among manufactured devices to generate the PUF signature. For example, there are delay chain based PUFs, wherein the PUF translates variations (difference) into delay variances. Delay chain based PUFs employ a set of delay chains made out of logic gates. Due to static variations of components, each chain will have different delay. By sampling the delay, a signature can be produced for the random number from the random number generator (RNG) 104.

Another approach is a memory-based PUF, wherein variations of devices in a bi-stable element are translated to generate either a "1" or "0". Such a memory-based PUF includes a memory cell array that may be implemented as any of a variety of memory cell arrays such as static random access memory (SRAM), dynamic random access memory (DRAM), magnetoresistive random access memory (MRAM), resistive random-access memory (RRAM), read-only memory (ROM), etc. A particular type of memory-based PUF is an SRAM PUF, which includes an SRAM array 106. These PUFs utilize small memory cell variations to produce signatures. For example, a signature may be generated by the SRAM array from the start-up states of cells, which is random and unique among different SRAM.

In some configurations, the RNG 104 includes a memory array upon which the PUF is based. For example, such an SRAM-based PUF uses the memory initial data content (power up condition), of the SRAM array 106, to generate the security keys. Bits of the generated key that do not change state from one power up cycle to the next are referred to as stable bits. However, attempting to identify and record each stable bit to be used for key generation would require a significant amount of time, and recording the stable bits could possibly expose the key generation to side attacks. In addition, it would require a significant number of additional bits to correct errors due to environmental effects, noise and aging that might affect the stable bits of the memory.

As noted above, some examples implement the PUF generator via an SRAM memory. For example, a PUF signature may be generated by using power-on states of an SRAM device. Even though an SRAM device includes symmetric cells (bits), manufacturing variability may still cause each bit of the SRAM device to tend to be at a high state (i.e., a logical "1") or at a low state (i.e., a logical "0") while the SRAM device is powered on. Such initial power-on states of the bits are randomly distributed across the whole SRAM device, which gives rise to a variability that can be defined by a PUF to produce a unique key of the SRAM device.

In other examples where an SRAM is used as a PUF generator, each bit of a security key is generated by comparing accessing speeds (e.g., reading speeds) of two memory cells of the memory device. In such examples, since the PUF signature is based on the comparison of reading speeds, no iteration to power up and down the memory device is required.

Regardless of the type of SRAM-based RNG 104, the bits or signature from the SRAM 106 may be scrambled. Scrambling the SRAM bits can randomize further the already random bits from the SRAM 106 and prevent security compromises by reading the SRAM 106 because what bits are stored in the OTP 110 are different from what is read from the SRAM 106. The scrambler 108 can be a bit-folding circuit. In other configurations, the scrambler 108 can be a linear feedback shift register (LFSR), and, optionally, paired with one or more XOR gates. Regardless of the type of scrambler, the read SRAM bits can be scrambled or changed into a new configuration, which makes the PUF 100 harder to compromise as the SRAM, even if read, is not the same as the bits stored in the OTP 110.

Another component of the PUF 100 can be a built-in self-test (BIST) 112. The BIST 112 may determine the functionality or proper operation of the OTP 110 and/or the RNG 104. The BIST 112 can send and receive signals from the OTP 110 and RNG 104 to determine that both components 110, 104 are functioning and functioning properly. This operational information may be communicated back to the controller 102.

A verify component 114 can verify the information or data stored within the OTP 110 and/or coming from the RNG 104. For example, the RNG 104 can store bits within the OTP 110, and the verify component 114 may then read the bits from the OTP 110 and compare those to information in the registers of the RNG 104 to determine if the bits were written properly to the OTP 110. Any type of information generated from this verification may then be sent to the controller 102 for further operations. In other situations, the OTP 110 can also verify information being read and outgoing to the output register 118. In this way, the controller 102 can determine if the output to the output register 118 has been sent and/or is correct.

The output register 118 may store bits from the OTP 110 to be output from the PUF 100. The output register 118 may be configurable, by the controller 102, to change the size of the key or the amount of response bits that will be sent out from the PUF 100. In at least some configurations, the output port 120 may output a set number bits, for example, 16 bits, in parallel or serial format. The output register 118 can store different size keys that may be larger than the 16 bits of the output 120. Thus, the output register 118 can be configurable to store the entire output key that will be sent out from the output 120 as one or more signals 128. The output port 120 may send the key bits in several signals 128, e.g., 16 bits at a time, after, in one or more consecutive reads, the output port 120 obtains all the key bits from the output register 118 and the entire key is sent out as signal(s) 128.

The output port 120 may be a parallel or serial port that sends signal(s) 128 to another device or function on or external to the integrated circuit that is in communication with the PUF 100. The output port 120 may have a set number bits, for example, 16 bits, which the output port 120 can send in any one signal 128. The output port 120 can send consecutive or repeated outputs until an entire key is provided as an output signal(s) 128.

The PUF 100 can also include an input address block 116. The input address block 116 can accept an input challenge signal 124, which may include an address. The address can be sent, by the input address block 116, to the OTP 110 to retrieve a key having the address. The key may be output as described herein as a response to the challenge signal. In at least some configurations, the input address block 116 may also scramble the address 124. In this way, the output key is randomized from the address and prevents determining the key by repeated challenges and responses. The scrambler in the input address block 116 can be an LFSR or other circuit.

Figure 2:
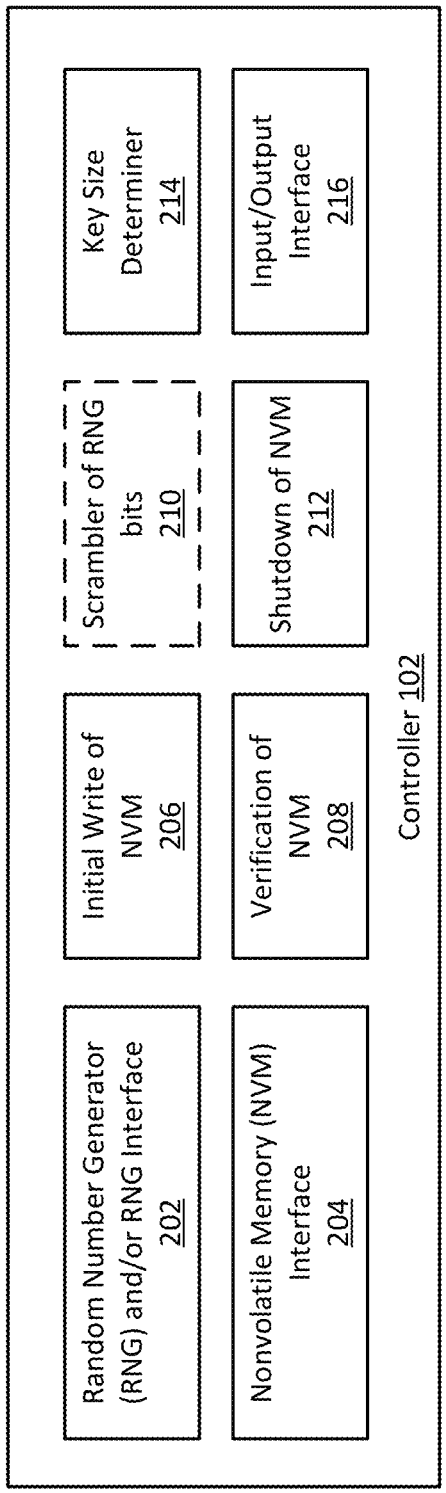
FIG. 2 is a block diagram illustrating aspects of an example controller of FIG. 1 in accordance with examples of the present application.

A set of functions or components, of the controller 102, may be as shown in FIG. 2. The functional components 202 through 216 can represent different types of functions or processes executed or produced by the controller 102. These different functions may be embodied as firmware that is loaded into the controller 102 from a memory or may be gates or other hardware that is permanently embodied within the integrated circuit of the controller 102. Regardless, these different functions help produce the output from the PUF 100 and control different functions available from the PUF 100.

A random number generator and/or random number generator interface 202 can interact with the RNG 104. As such, the controller 102 can, in at least some configurations, read or write to the SRAM 106. Further, the controller 102 can start the SRAM or the RNG 104. The controller 102 can also interface with the scrambler 108. Thus, the controller 102 can start the scrambler 108, affect how the scrambler functions, read information from the scrambler 108, or conduct other operations with the scrambler 108.

The controller 102 may also include a NVM interface 204. The NVM interface 204 can interact with the nonvolatile memory 110. Thus, the controller 102 can read or write information to the NVM 110. In some configurations, the controller 102 may only be able to read certain portions of the NVM 110. For example, the controller 102 may determine whether the OTP 110 has been programmed with random numbers. Further, the controller 102 can start the OTP 110 or conduct other operations, including, for example, causing the OTP 110 to send a key to the output register 118.

The initiate write of the NVM function 206 can conduct the first initial storing of random numbers to the NVM 110. This initiate write of the NVM function 206 can cause the SRAM 106 to provide data to the scrambler 108, which may then be read or written into the OTP 110. Thus, the initiate write of the NVM function 206 controls the process for storing the random numbers into the NVM 110.

The verification of the NVM function 208 can verify, through verify block 114, that the information being written to the OTP 110 was the same as that provided in the registers of the scrambler 108. Thus, the controller 102 can interact with the verify block 114, with the random number generator 104, and with the OTP 110 to determine if the correct data was written into the OTP 110 from the RNG 104.

In some configurations, the controller 102 can function as the scrambler to scramble bits from the SRAM 106 using optional scrambler of RNG bits function 210. In this way, controller 102, functions as the scrambler 108. Thus, the controller 102 can include the bit-folding circuit function, the LFSR circuit/function, or other types of scrambling technology. The controller 102 can provide the necessary scrambling of bits for the OTP 110.

The shutdown of the NVM function 212 can stop the writing to the NVM 110 after the NVM 110 stores the random number scrambled from the scrambler 108. Thus, the controller 102 can also cause the OTP DEVICE 110 to set one or more bits that indicate that the OTP 110 has been written to and the keys have been stored. Further, when starting up the PUF 100, the controller 102 can read these set bits from the OTP 110 and then, based on the OTP 110 status as having been programmed, can write bits, e.g., one's and/or zero's, to the SRAM 106 to prevent reading the SRAM's start-up state.

The key size determiner 214 can be an interface that can receive signal 122 that indicates the key size desired as an output. The key size determiner 214 may then interact with the output register 118 to set the size of the registers that store and receives bits associated with the key having the set key size. Thereinafter, the controller 102 can control the output register 118 to send the key through to the output port 120.

An input/output interface 216 can interact with circuits, devices, functions, etc. external to the PUF 100. The input signals 122 can be sent to the input/output interface 216 of the controller 102 to conduct certain functions. Further, the input/output interface 216 can also send signal 126 or other signals sent from the PUF 100. The input/output interface 216 can interact with the output register 118 and/or output port 120 to send output signals 126, 128. These output signals 126, 128 can include indication that the output 128 is ready in the output register 118 and/or output port 120. When a challenge (possibly with an address) is received to request a security key, the input/output interface 216 can also interact with the input address block 116, which may receive the address and scramble that address, to receive an indication at the controller that an address has been received. The input address block 116 may supply the address to the NVM 110 to have a key read-out, which is put into the output register 118. Thus, external communications may be controlled by the input/output interface 216 of the controller 102.

Figure 3:
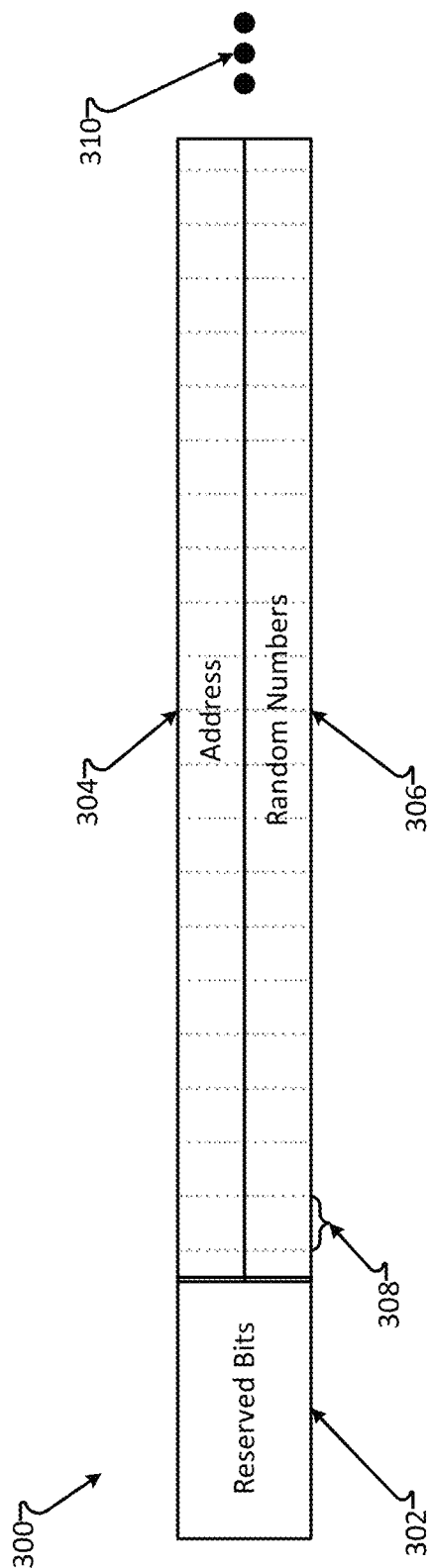
FIG. 3 is a block diagram illustrating aspects of an example data structure of the PUF device of FIG. 1 in accordance with examples of the present application.

An example of a data structure 300 that may represent the random bits stored as keys in the OTP 110 may be as shown in FIG. 3. The data structure 300 can have different fields or portions as provided and shown in FIG. 3. There may be more or fewer fields or portions that that shown in FIG. 3, as represented by ellipses 310. The data structure 300 can include a portion of one or more reserved bits 302, one or more addresses 304, associated with one or more random numbers 306. The reserve bits 302 can be one or more bits used to provide information to the controller 102 or other components within the PUF 100. For example, the reserved bits 302 can have one or more bits set to indicate that the OTP 110 has been programmed with keys stored as the random numbers 306.

The addresses 304 are a set of identifiers (IDs) or data that indicates or is associated with a set of random numbers in portion 306. The addresses 304 can be specified or targeted by the input address block 116. The random numbers 306 associated with the addresses 304 can be extracted by requesting a key from the data structure 300 using the address 304.

The random numbers 306 are the set of scrambled bits from the SRAM 106 that are stored within the OTP 110. These random numbers 306 are the keys that may be accessed or retrieved from/during a challenge/response. The random numbers 306 can be input into the data structure 300, in portions, such as portion 308. In other configurations, the portions 308 represent the set of random bits that equate to a key. These portions 308 can include the output bits sent to the output register 118 and then to the output port 120. As such, there may be several keys 308 within the random numbers that can be accessed. This large number of random bits that can be packaged into a security keys allows for flexibility in using the OTP 110 to provide many different security keys.

Figure 4A:
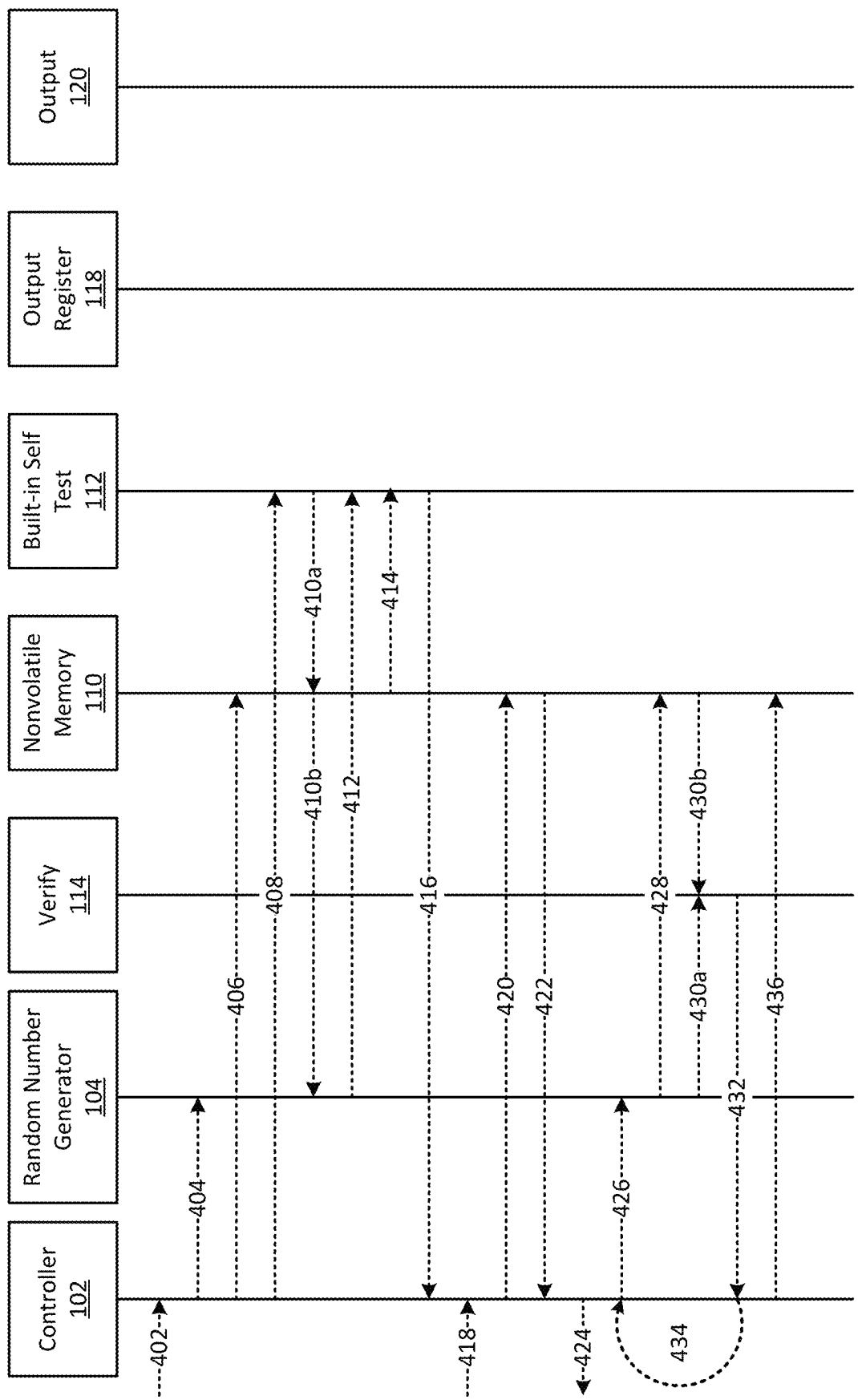
FIG. 4A is a communication diagram illustrating aspects of the communications between components of the PUF device in accordance with examples of the present application.
Figure 4B:
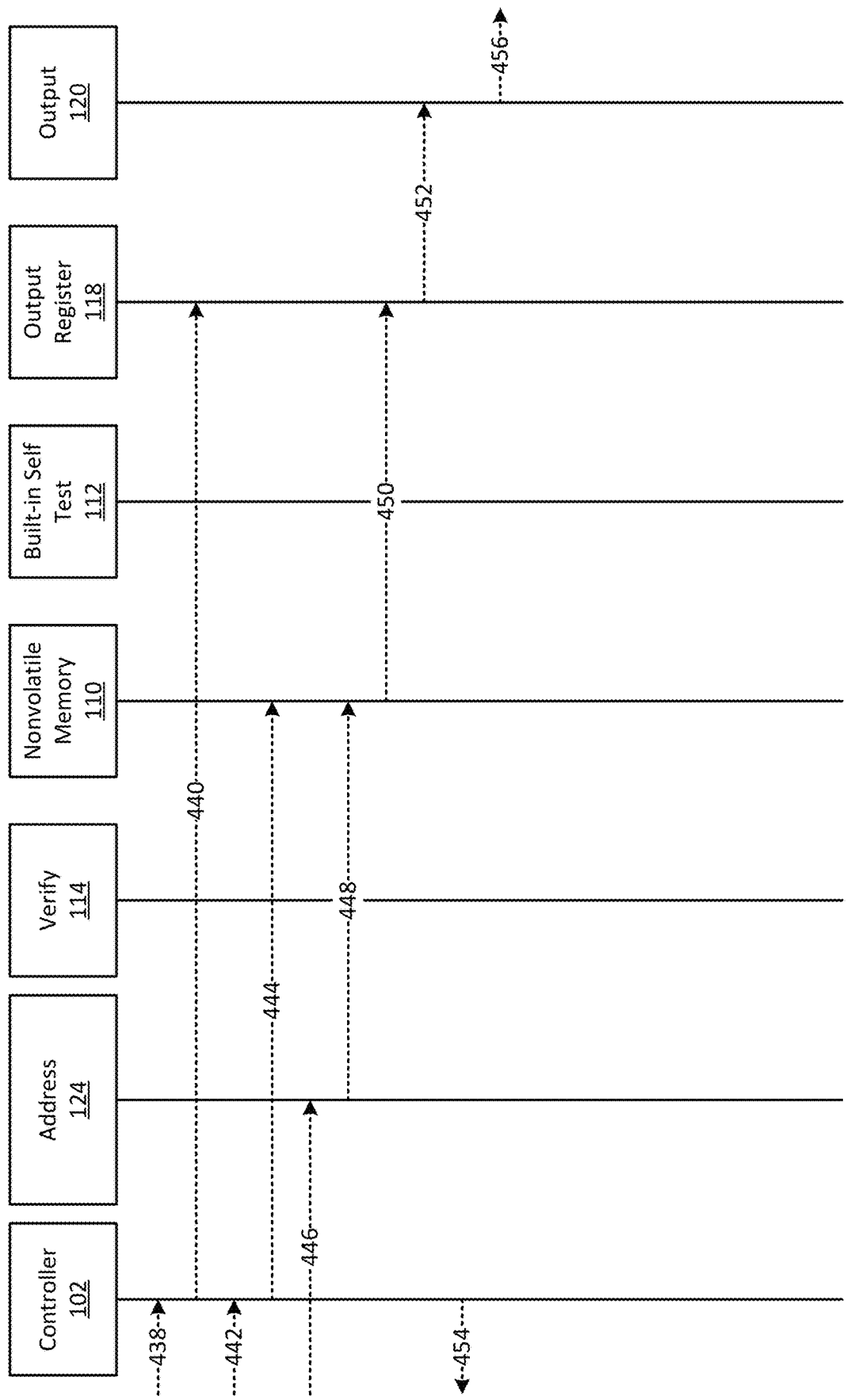
FIG. 4B is another communication diagram illustrating aspects of the communications between components of the PUF device in accordance with examples of the present application.

Examples of the various signaling that may occur in the PUF 100 may be as shown in FIGS. 4A and 4B. The controller 102 can receive a reset signal 402 into the input/output interface 216. The reset signal 402 can be an external signal to reset the PUF 100. In response to the reset signal 402, the controller 102 may send a reset or start signal 404 to the random number generator 104, for example, to the SRAM 106, and/or signal 406 to the OTP 110.

Further, the controller 102 can send the test signal 408 to the BIST 112. The BIST 112 can the request the status of the RNG 104 and/or the OTP 110, in signals 410a and 410b. The RNG 104 can respond with that status, in signal 412, while the nonvolatile memory 110 can respond with the status, in signal 414. This status information may be sent back from the BIST 112 to the controller 102, in signal 416. The controller 102 may then know the status of the different components within the PUF 100 and report that status externally, if needed. Thus, these signals 402 through 416 represent the signaling for a reset and/or self-test to determine that the internal circuitry of the PUF 100 is functional.

The controller 102 may then receive a status check signal 418. The controller 102 may, in response to signal 418, query the nonvolatile memory 110, with signal 420, for the status of the OTP 110. The signal 420 may represent the controller 102 reading the reserve bits 302 from the data structure 300. These reserve bits 302 may indicate whether the OTP 110 has been programmed. This information may be sent back to or read by the controller 102. The controller 102 may then receive the signal 422 and output the status, in signal 424. The status 424 can indicate whether the OTP 110 has or has not been programmed.

If the OTP 110 has not been programmed, the controller 102 may then act to store information into the OTP 110. In this sequence of signals, the controller 102 can send a signal 426 to the RNG 104 to begin generating scrambled random numbers to be stored in the OTP 110. The RNG 104 may then provide these scrambled random numbers, in signal 428, to the OTP 110. While the SRAM 106 may be read-out in 16 bit blocks or other sized blocks, the bits may be read into the OTP 110 at one bit at a time. The random bits may be stored into the NVM 110.

After reading in a set of bits into the OTP 110, the OTP 110 and the RNG 104 may each send the stored bits to the verify block 114, as signals 430a and 430b. The verify block 114 may determine whether the bits, which were stored into the OTP 110, are the same as what was output from the RNG 104. If the bits are verified, the verify block 114 can send signal 432 back to the controller 102 indicating the verification. If the verify block 114 indicates that the bits are not the same, then the controller 102 may receive a signal 432 indicating the write failure. The controller 102 may then cause SRAM 106 to resend the scrambled bits to the OTP 110. If a verification is failed twice, the controller 102 may output an error as a signal 122. However, if the verification is correct, the controller 102 may indicate that the process of storing random bits into the OTP 110 is to continue, as represented by arc 434.

In some examples, the controller 102 may continue the process, represented by arc 434. After all the random bits possible are stored in the OTP 110, the controller 102 may send signal 436 to burn-in the OTP 110 and prevent the OTP 110 from receiving more bits. Thus, the OTP 110 may then, at that point, be unable to store further bits but may be available for the challenge and response process for generating or providing keys.

The controller 102 can also receive a key size signal 438 shown in FIG. 4B. The key size signal 438 can indicate the size of the keys to be output by the PUF 100. In response to signal 438, the controller 102 may then send the signal 440 to the output register 118 to set the key size in accordance to the information in signal 438. Thus, the output register 118 may provide available storage capacity for all the bits of the key requested as an output.

The controller 102 may then receive a challenge signal 442 to request a key. This signal 442 may trigger the controller 102 to send the signal 444 to the OTP 110 to prepare to receive the address input as a challenge. The controller 102 may also interface with the input address block 116 to determine when the input address is received and control the output of the address to the OTP 110. The input address may be received, in signal 446, at the input address block 116. The input address may then be scrambled and the scrambled address can be sent to the OTP 110, as signal 448. The OTP 110 can access the address, in address data 304, and read-out the random numbers 306 associated with the received address. The associated random numbers 306 represent the key that can be then sent to the output register 118, as signal 450, and/or the verify block 114 (not shown). The output register 118 may then provide the key, in smaller portions, in signal(s) 452, to the output port 120. The controller 102 may also send signal 454 to indicate that the output register 118 and/or the output port 120 is ready to output. Upon receiving indication that the output can be received, the output key can be sent out in consecutive signals 456 from the output port 120.

Figure 5:
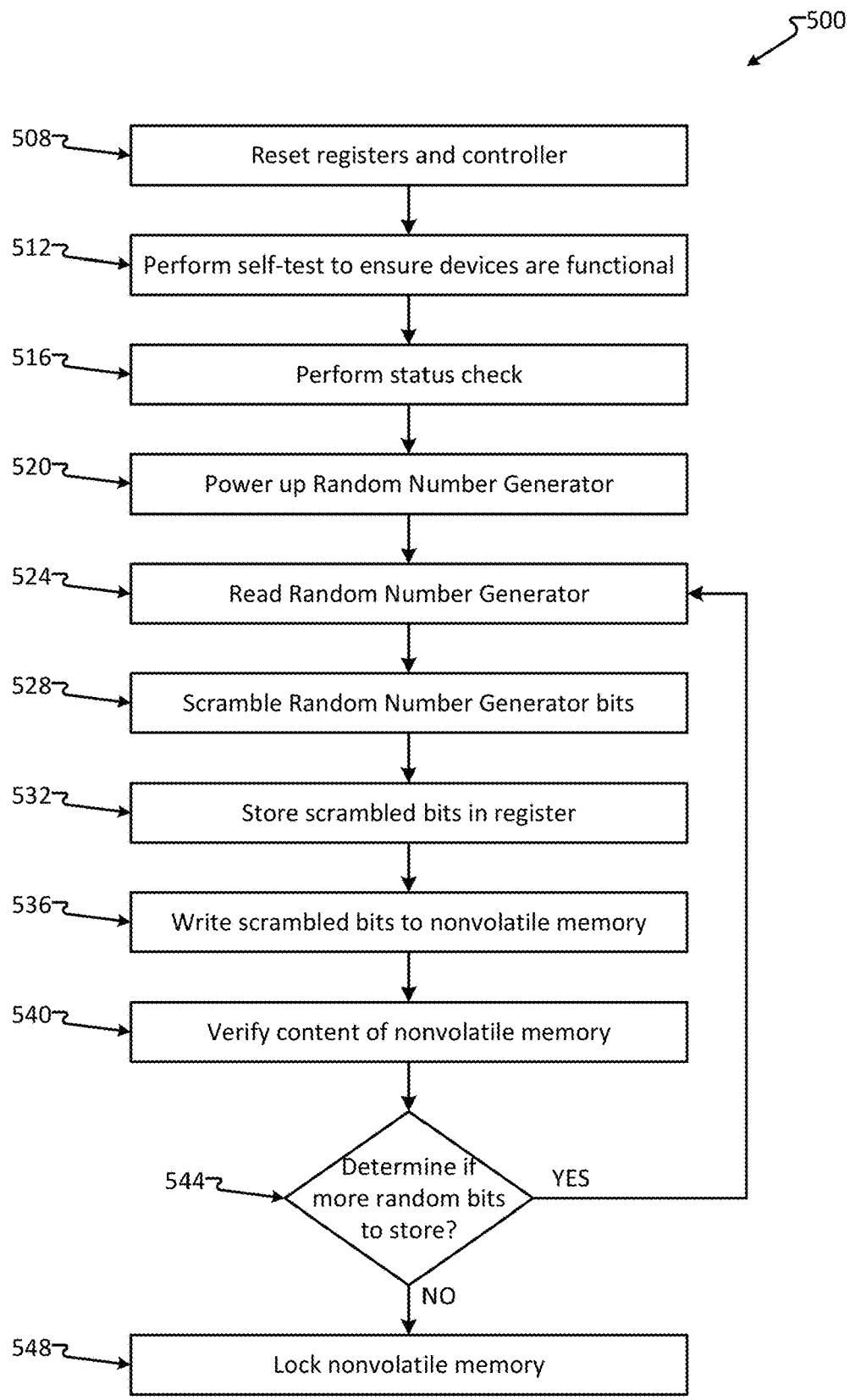
FIG. 5 is a process flow diagram illustrating aspects of a method for storing a random number in a nonvolatile memory of the PUF device in accordance with examples of the present application.

FIG. 5 is a process flow diagram generally illustrating aspects of an example method 500 for generating random numbers and storing those random numbers into the OTP 110, in accordance with aspects of the present disclosure. A general order for the operations of the method 500 is shown in FIG. 5. The method 500 can include more or fewer operations or steps or can arrange the order of the operations or steps differently than those shown in FIG. 5. The method 500 can be executed as a set of computer-executable instructions executed by a processor, such as controller 102 of the PUF 100, and encoded or stored on a computer readable medium. Further, the method 500 can be performed by gates or circuits associated with a processor, an Application Specific Integrated Circuit (ASIC), a Field Programmable Gate Array (FPGA), a System on Chip (SOC), another IC, or other hardware device, for example, the controller 102. Hereinafter, the method 500 shall be explained with reference to the systems, components, devices, modules, circuits, firmware, software, signals, data structures, methods, etc. described in conjunction with FIGS. 1-4B and 6-8; however, it will be understood by those of skill in the art that some or all of the operations of method 500 can be performed by or using different elements from those described below.

The registers, devices, components, and the controller 102 may be reset, in operation 508. The input/output interface 216, of the controller 102, can receive a reset signal 402, as part of signals 122. The reset signal 402 indicates to the controller 102 to reset or start the PUF 100. The RNG interface 202 may then a send reset or start signal 404 to the SRAM 106. The NVM interface 204 can send the reset or start signal 406 to the OTP 110. The controller 102 can also send a test signal 408 to the BIST 112 to test the functioning of the other components.

The BIST 112 may then perform a self-test on the RNG 104 and/or the OTP 110, in operation 512. The NVM 110 and the RNG 104 may send responses back to the BIST 112 that may indicate whether those components 104, 110 are functioning and functioning properly. This self-test information may then be sent back to the controller 102.

The controller 102 may then receive an optional status check signal 418 and then perform a status check on the OTP 110, in operation 516. The status check may be initiated by an input signal 418 received by the input/output interface 216 of the controller 102. In other situations, the controller 102 may check the status without an input signal. The NVM interface 204, of the controller 102, can send signal 420 to the OTP 110 to determine the status of the OTP 110. The signal 420 reads the reserve bits 302, in the OTP 110, to determine if the reserve bits indicate that the OTP 110 has been written to with random bits and is locked.

The reserve bits may have one bit to indicate that the OTP 110 has been written and/or is locked. In another configuration, there may be two or more bits set to indicate that the OTP 110 has been written and/or is locked. For example, the reserved bits may be read and analyzed by majority vote of three or more bits to determine that the OTP 110 has been written and/or is locked. The controller 102 may then determine the status of the OTP 110 based on the reserve bits. This status may be sent out, by the input/output interface 216, as an output signal 424.

The initial write of the NVM function 206, of the controller 102, may then power up the SRAM 106 of the random number generator 104, in operation 520. Specifically, the initial write of the NVM function 206 starts or initializes the SRAM 106. The initialization may provide a first set of bits in the SRAM 106 that are random based on the uniqueness of the SRAM 106. These unique random bits may be read-out from the SRAM 106 by the initial write of the NVM function 206, in operation 524. The read-out bits may then be sent to a scrambler 108, where the random bits from the SRAM 106 are scrambled, in operation 528. A bit folding circuit or a linear feedback shift register may scramble the bits so that the bits in the scrambler 108 are different than those read-out from the SRAM 106. The scrambled random number bits may then be stored in a register or memory of the scrambler 108 to be stored in the OTP 110.

From the register with the scrambled bits, the RNG 104 may write the scrambled bits to the OTP 110, in operation 536. In some configurations, the OTP 110 may only receive only one bit per clock cycle. As such, if the register of bits, in the scrambler 108, has more than one bit, the RNG 104 may send one bit at a time from the RNG 104 to the OTP 110 during each clock cycles. The bits are written into the OTP 110 until a block of bits have been written. At this point, the block of bits may be read-out from the OTP 110 to a verify block 114.

The verify block 114 can compare the block of bits sent from the OTP 110 to the bits from the register of the scrambler 108, in operation 540. The verify block 114 determines if the two blocks of bits or the same. If the blocks are not the same, a message 432 may be sent to the verification of the NVM function 208, of the controller 102, which may then restart the process to write the block of bits again to the OTP 110. If the blocks are the same, then a signal 432 indicating the positive comparison can be sent to the verification of the NVM function 208, of the controller 102, and the process continues.

At this point, the controller 102 can determine if there are more random bits to store into the OTP 110, in operation 544. If the OTP is not full and there are more bits to store, the method 500 may proceed "YES" back to operation 524 to store a next block of bits. However, if the OTP 110 has a complete set of random bits stored within the OTP device 110, the method 500 may proceed "NO" to operation 548, where the controller 102 can lock the OTP 110 in operation 548.

The shutdown of the NVM function 212, of the controller 102, can lock the OTP 110 by setting the reserve bits 302 within the OTP DEVICE 110, in operation 548. Thus, the shutdown of the NVM function 212, of the controller 102, can prevent any further storage of data within the OTP 110. At this point, the random numbers stored in the OTP 110 are stored as a set of possible keys 308 within field 306. Each of the random bits 306 may be associated with an address 304. To obtain a key, the OTP 110 can accept an address matching an address in field 304. If an address message matches, the OTP 110 can read-out the random bits associated with the received address and send that set of data as a key to an output register 118.

Figure 6:
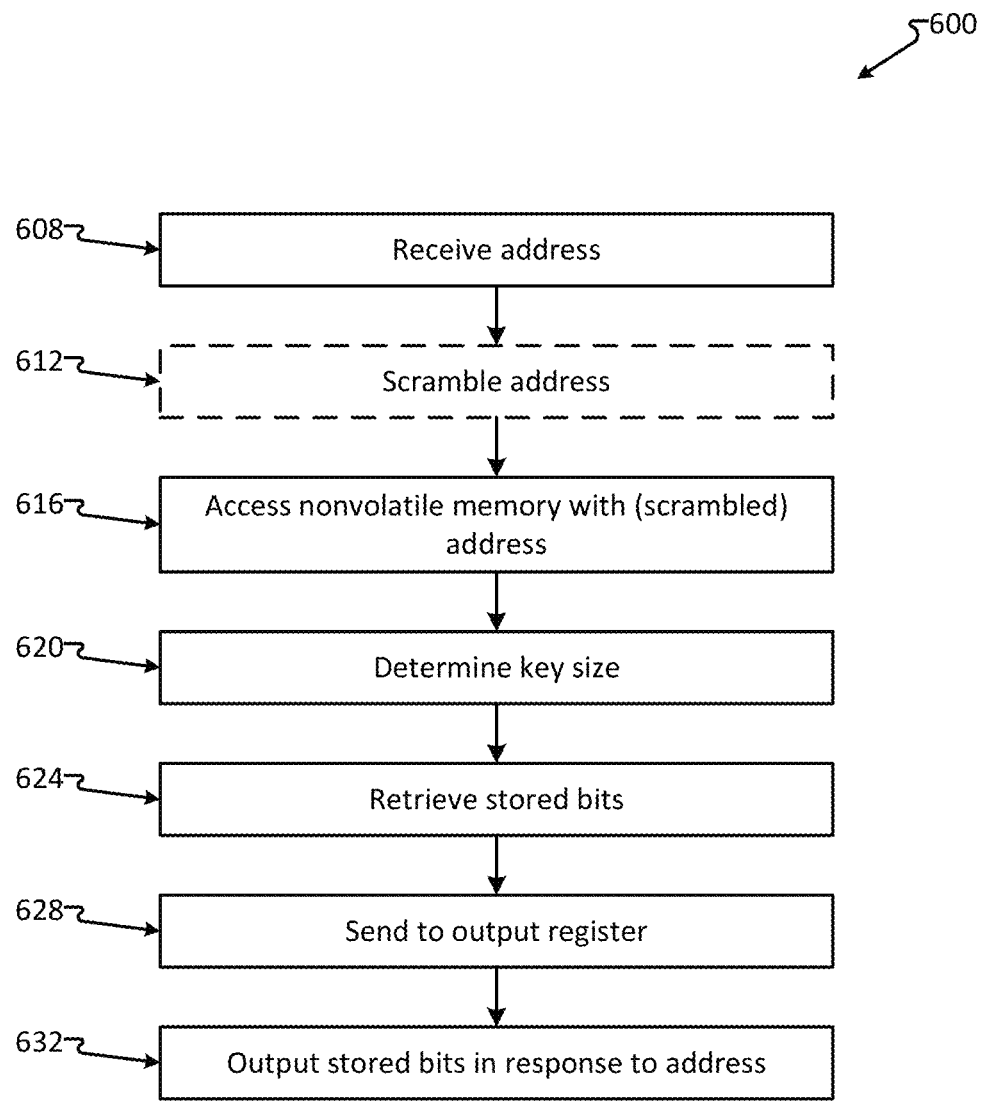
FIG. 6 is a process flow diagram illustrating aspects of an example method for generating a PUF security key in accordance with examples of the present application.

FIG. 6 is a process flow diagram generally illustrating aspects of an example method 600 for generating a security key, in accordance with aspects of the present disclosure. A general order for the operations of the method 600 is shown in FIG. 6. The method 600 can include more or fewer operations or steps or can arrange the order of the operations or steps differently than those shown in FIG. 6. The method 600 can be executed as a set of computer-executable instructions executed by a processor, such as controller 102 of the PUF 100, and encoded or stored on a computer readable medium. Further, the method 600 can be performed by gates or circuits associated with a processor, an ASIC, a FPGA, a SOC, IC, or other hardware device, for example, the controller 102. Hereinafter, the method 600 shall be explained with reference to the systems, components, devices, modules, circuits, firmware, software, signals, data structures, methods, etc. described in conjunction with FIGS. 1-5 and 7-8; however, it will be understood by those of skill in the art that some or all of the operations of method 600 can be performed by or using different elements from those described below.

The PUF 100 can receive an address, as a challenge, in operation 608. The address input signal 446, part of signals 124, may be sent to an input address block 116. This input address 446 may be accompanied with a challenge or other signal 442 that may be sent to the controller 102, as part of signals 122. The address signal 442 may be received by the controller 102 and then another signal 444 can be sent to the OTP 110 to initiate the response, by the OTP 110, with the key when the address signal 448 is provided.

Optionally, input address block 116 can scramble the input address 446, in operation 612. The input address block 116 may also include a LFSR other type of scrambler. The input address block 116 can scramble the input address 446 to make the security key provided more random. The scrambled address may then be sent to the OTP 110, as signal 448, to access the OTP 110, in operation 616. Thus, the input address block 116 provides the scrambled address to the OTP 110 to retrieve a desired security key.

The key size determiner 214, of the controller 102, can receive a key size indicator signal 438, in operation 620. This key size indicator message 438 can be used by the controller 102 to set the output key size in the output register 118 by sending signal 440 to the output register 118. This key size information may also be stored in the controller 102. Thereinafter, when obtaining a key, the controller 102 can determine the key size, in operation 620. The controller 102 can access information stored about the key size and provide that information to the OTP 110 and/or the output register 118.

The OTP 110 may then retrieve stored random bits 306, within data structure 300, associated with the received address 444, in operation 624. Thus, the OTP 110 can scan for an address 304 that is the same or matches the address 444. When a match is found, the OTP 110 can retrieve the random numbers 306 associated with this address 304; the OTP 110 retrieves the number bits associated with the key size 308 set by the controller 102.

This key information may then be sent to the output register 118, as signal 450, in operation 628. The output register 118 may accept the full key size. The output register 118 may then output the stored bits, in the output register 118, to the output port 120 as signal 452, to be sent out as signal 456, which may be part of signals 128. In some situations, the output port 120 may accept a smaller portion of the data, in the key 308 stored in the output register 118. As such, the output register 118 may send data to the output port 120 repetitively. The output register 118 can read parts of the keys in the register and send them out through output port 120 until the entire key is sent as signal(s) 456, in operation 632. In at least some circumstances, the input/output interface 216, of the controller 102, can send an output ready signal 126 when the key is ready to be sent out.

Figure 7:
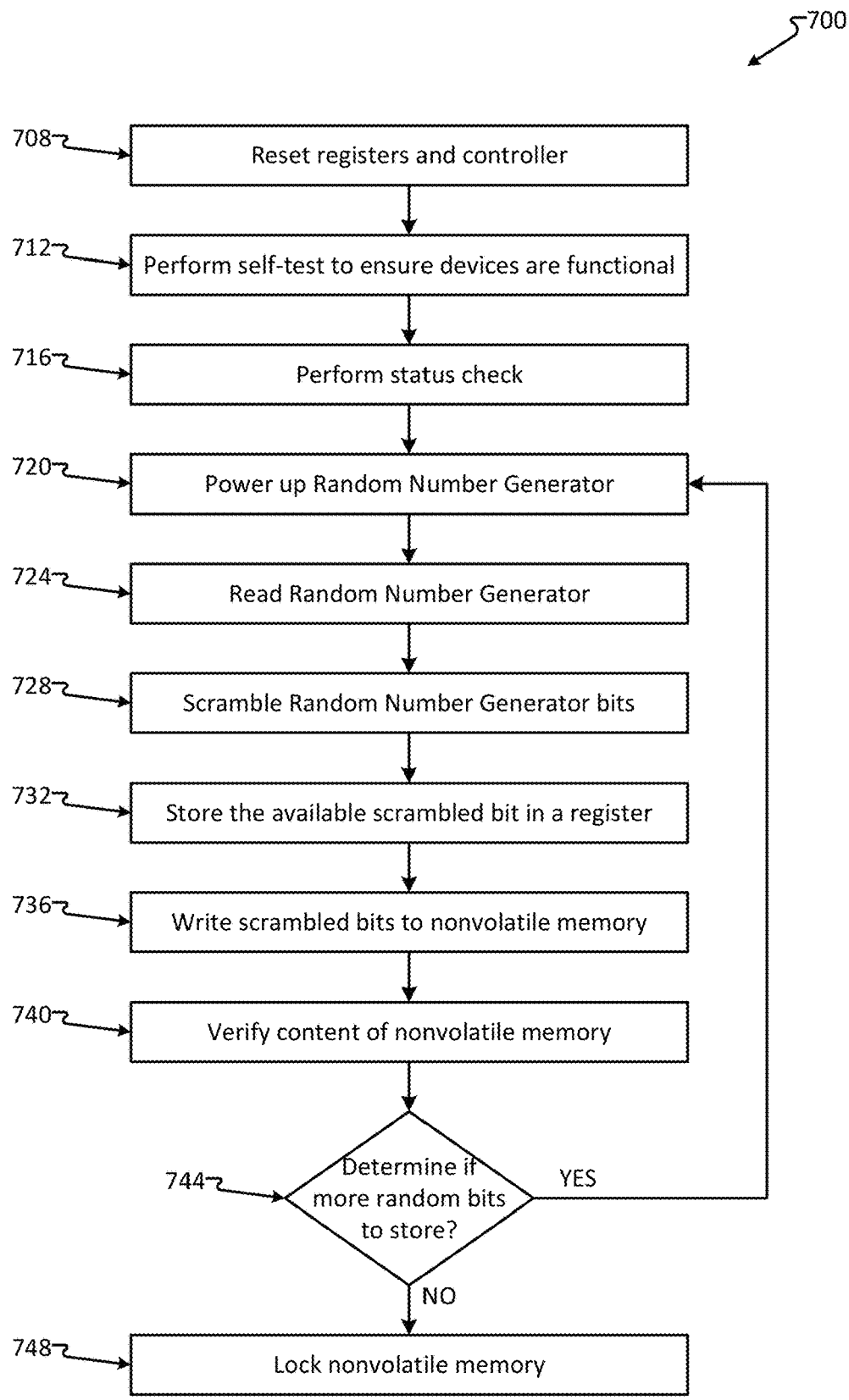
FIG. 7 is another process flow diagram illustrating aspects of a method for storing a random number in a nonvolatile memory of the PUF device in accordance with examples of the present application.

FIG. 7 is a process flow diagram generally illustrating aspects of an example method 700 for generating random numbers to store in the OTP 110, in accordance with aspects of the present disclosure. A general order for the operations of the method 700 is shown in FIG. 7. The method 700 can include more or fewer operations or steps or can arrange the order of the operations or steps differently than those shown in FIG. 7. The method 700 can be executed as a set of computer-executable instructions executed by a processor, such as the controller 102 of the PUF 100, and encoded or stored on a computer readable medium. Further, the method 700 can be performed by gates or circuits associated with a processor, an ASIC, a FPGA, a SOC, IC, or other hardware device, for example, the controller 102. Hereinafter, the method 700 shall be explained with reference to the systems, components, devices, modules, circuits, firmware, software, signals, data structures, methods, etc. described in conjunction with FIGS. 1-6 and 8; however, it will be understood by those of skill in the art that some or all of the operations of method 700 can be performed by or using different elements from those described below.

The registers, devices, components, and the controller 102 may be reset, in operation 708. The input/output interface 216, of the controller 102, can receive a reset signal 402, as part of signals 122. The reset signal 402 indicates to the controller 102 to reset or start the PUF 100. The RNG interface 202 may then send a reset or start signal 404 to the SRAM 106. The NVM interface 204 can send the reset or start signal 406 to the OTP 110. The controller 102 can also send a test signal 408 to the BIST 112 to test the functioning of the other components.

The BIST 112 may then perform a self-test on the RNG 104 and/or the OTP 110, in operation 712. The NVM 110 and the RNG 104 may send responses back to the BIST 112 that may indicate whether those components 104, 110 are functioning and functioning properly. This self-test information may then be sent back to the controller 102.

The controller 102 may then receive an optional status check signal 418 and then perform a status check on the OTP 110, in operation 716. The status check may be initiated by an input signal 418 received by the input/output interface 216 of the controller 102. In other situations, the controller 102 may check the status without an input signal. The NVM interface 204, of the controller 102, can send signal 420 to the OTP 110 to determine the status of the OTP 110. The signal 420 reads the reserve bits 302, in the OTP 110, to determine if the reserve bits indicate that the OTP 110 has been written to with random bits and is locked.

The reserve bits may have one bit to indicate that the OTP 110 has been written and/or is locked. In another configuration, there may be two or more bits set to indicate that the OTP 110 has been written and/or is locked. For example, the reserved bits may be read and analyzed by majority vote of three or more bits to determine that the OTP 110 has been written and/or is locked. The controller 102 may then determine the status of the OTP 110 based on the reserve bits. This status may be sent out, by the input/output interface 216, as output signal 424.

The initial write of the NVM function 206, of the controller 102, may then power up the SRAM 106 of the random number generator 104, in operation 720. Specifically, the initial write of the NVM function 206 starts or initializes the SRAM 106. The initialization may provide a first set of bits in the SRAM 106 that are random based on the uniqueness of the SRAM 106. These unique random bits may be read-out from the SRAM 106 by the initial write of the NVM function 206, in operation 724. The read-out bits may then be sent to a scrambler 108, where the random bits from the SRAM 106 are scrambled, in operation 728. A bit folding circuit or a linear feedback shift register may scramble the bits so that the bits in the scrambler 108 are different than those read-out from the SRAM 106. The scrambled random number bits may then be stored in a register or memory of the scrambler 108 to be stored in the OTP 110, in operation 732.

From the register with the scrambled bits, the RNG 104 may write the scrambled bits to the OTP 110, in operation 736. In some configurations, the OTP 110 may only receive only one bit per clock cycle. As such, if the register of bits, in the scrambler 108, has more than one bit, the RNG 104 may send one bit at a time from the RNG 104 to the OTP 110 during each clock cycles. The bits are written into the OTP 110 until a block of bits have been written. At this point, the block of bits may be read-out from the OTP 110 to a verify block 114.

The verify block 114 can compare the block of bits sent from the OTP 110 to the bits from the register of the scrambler 108, in operation 740. The verify block 114 determines if the two blocks of bits or the same. If the blocks are not the same, a message 432 may be sent to the verification of the NVM function 208, of the controller 102, which may then restart the process to write the block of bits again to the OTP 110. If the blocks are the same, then a signal 432 indicating the positive comparison is sent to the verification of the NVM function 208, of the controller 102, and the process continues.

At this point, the controller 102 can determine if there are more random bits to store the OTP 110, in operation 744. If the OTP is not full and there are more bits to store, the method 700 may proceed "YES" back to operation 720 to store a next block of bits. However, if the OTP 110 has a complete set of random bits stored within the OTP device 110, the method 700 may proceed "NO" to operation 748, where the controller 102 can lock the OTP 110. In operation 744, there may be more random bits to store in the OTP 110. However, the SRAM 106 may be smaller in size than the OTP 110, for example, the OTP 110 may be 16 kbit in size while the SRAM 106 is 1 kbit in size. In these situations, the SRAM 106 may be initialized again by the controller 102 to restart the process of reading out random bits. In this way, several iterations of initializing and reading the bits from the SRAM 106 may be used to write into a larger OTP 110. Thus, the method 700 proceeds, in several iterations, back to operation 720 rather than back to operation 724, as shown in FIG. 5.

The shutdown of the NVM function 212, of the controller 102, can lock the OTP 110 by setting the reserve bits 302 within the OTP DEVICE 110, in operation 748. Thus, the shutdown of the NVM function 212, of the controller 102, can prevent any further storage of data within the OTP 110. At this point, the random numbers stored in the OTP 110 are stored as a set of possible keys 308 within field 306. Each of the random bits 306 may be associated with an address 304. To obtain a key, the OTP 110 can accept an address matching an address in field 304. If an address message matches, the OTP 110 can read-out the random bits associated with the received address and send that set of data as a key to an output register 118.

Figure 8:
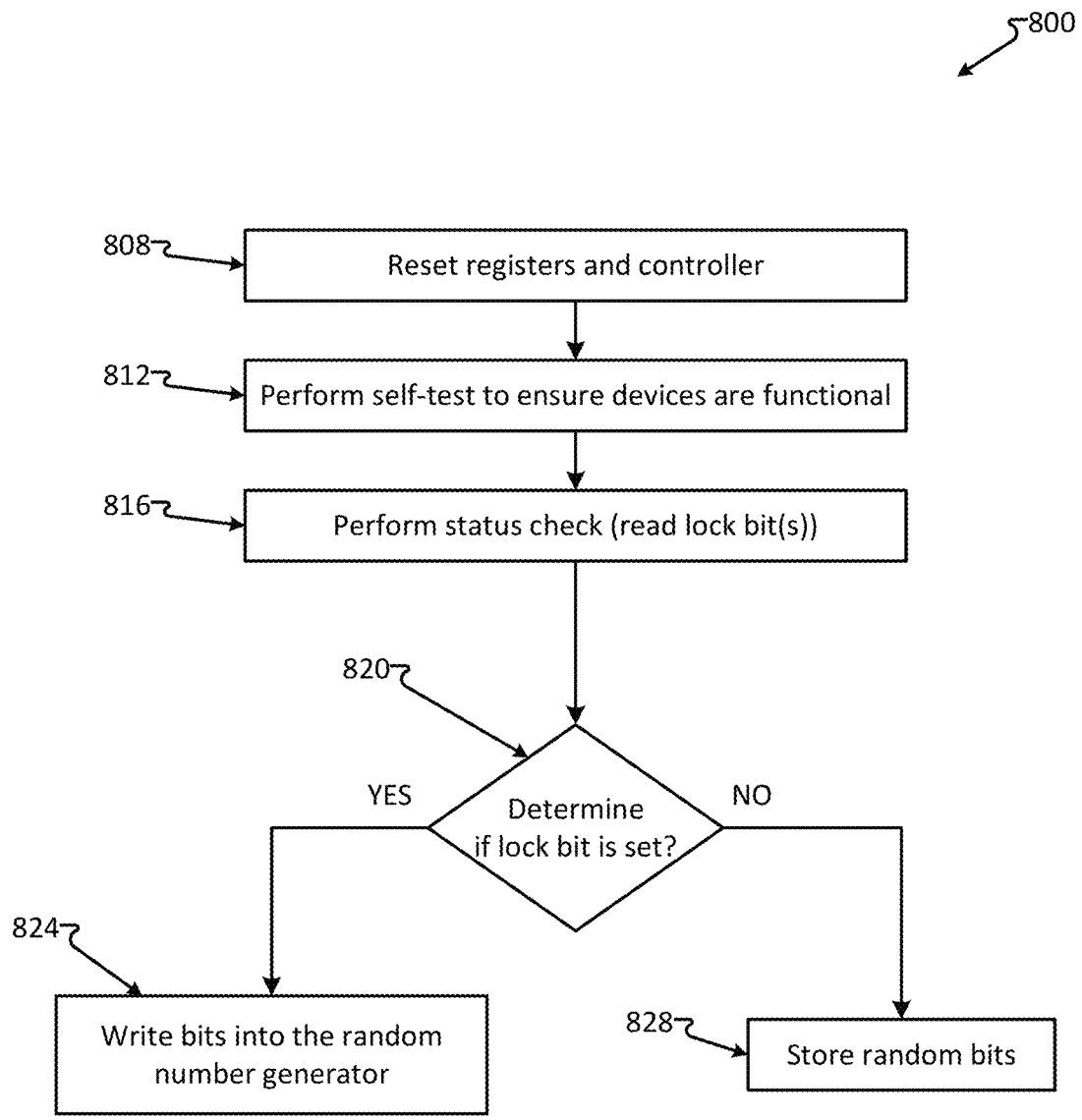
FIG. 8 is a process flow diagram illustrating aspects of a method for determining the state of the PUF device in accordance with examples of the present application.

FIG. 8 is a process flow diagram generally illustrating aspects of an example method 800 for starting a process with the PUF 100, in accordance with aspects of the present disclosure. A general order for the operations of the method 800 is shown in FIG. 8. The method 800 can include more or fewer operations or steps or can arrange the order of the operations or steps differently than those shown in FIG. 8. The method 800 can be executed as a set of computer-executable instructions executed by a processor, such as controller 102 of the PUF 100, and encoded or stored on a computer readable medium. Further, the method 800 can be performed by gates or circuits associated with a processor, an ASIC, a FPGA, a SOC, IC, or other hardware device, for example, the controller 102. Hereinafter, the method 800 shall be explained with reference to the systems, components, devices, modules, circuits, firmware, software, signals, data structures, methods, etc. described in conjunction with FIGS. 1-7; however, it will be understood by those of skill in the art that some or all of the operations of method 800 can be performed by or using different elements from those described below.

The registers, devices, components, and the controller 102 may be reset, in operation 808. The input/output interface 216, of the controller 102, can receive a reset signal 402, as part of signals 122. The reset signal 402 indicates to the controller 102 to reset or start the PUF 100. The RNG interface 202 may then send a reset or start signal 404 to the SRAM 106. The NVM interface 204 can send the reset or start signal 406 to the OTP 110. The controller 102 can also send a test signal 408 to the BIST 112 to test the functioning of the other components.

The BIST 112 may then perform a self-test on the RNG 104 and/or the OTP 110, in operation 812. The NVM 110 and the RNG 104 may send responses back to the BIST 112 that may indicate whether those components 104, 110 are functioning and functioning properly. This self-test information may then be sent back to the controller 102.

The controller 102 may then receive an optional status check signal 418 and then perform a status check on the OTP 110, in operation 816. The status check may be initiated by an input signal 418 received by the input/output interface 216 of the controller 102. In other situations, the controller 102 may check the status without an input signal. The NVM interface 204, of the controller 102, can send signal 420 to the OTP 110 to determine the status of the OTP 110. The signal 420 reads the reserve bits 302, in the OTP 110, to determine if the reserve bits indicate that the OTP 110 has been written to with random bits and is locked.

The reserve bits may have one bit to indicate that the OTP 110 has been written and/or is locked. In another configuration, there may be two or more bits set to indicate that the OTP 110 has been written and/or is locked. For example, the reserved bits may be read and analyzed by majority vote of three or more bits to determine that the OTP 110 has been written and/or is locked. The controller 102 may then determine the status of the OTP 110 based on the reserve bits, in operation 820. This status may be sent out, by the input/output interface 216, as an output signal 424.

If the lock bit(s) is set, the method 800 proceeds "YES" to operation 824 where the controller 102 can write bits into the SRAM 106. Here, the SRAM 106, after initialization, may contain the same or a similar set of bits to those bits written or provided to the scrambler and then written into the OTP 110. To prevent those bits from being read-out and possibly allowing an external device or function determine what is in the OTP 110, the controller 102 can write bits (e.g., one's and/or zero's) into the SRAM 106 to change what is being stored in the SRAM 106. In this way, if the SRAM 106 is read, what is in the SRAM 106 will be different than what was used to create the keys in the OTP 110.

If it is determined that the lock bit(s) is not set, process 800 may proceed "NO" to store random bits in the OTP 110, in operation 828. The storing of random bits in operation 828 may be similar to the processes described in conjunction FIGS. 5 and 7.

Among other things, disclosed embodiments thus provide a PUF that can generate a unique signature from the SRAM or random number generator. These signatures can be stored in the NVM, where those signatures do not change due to changes in heat or age of the integrated circuit. In previous SRAM-based devices, the signature in the SRAM could vary with age and heat. In other past OTP-type PUFs, those previous PUFs required an external port to store in the bits into the OTP. This external port into the PUF was a weakness in the security of the PUF, as the port could be used to write to or read from the OTP. In the aspects herein, the SRAM being internal to the PUF does not use an external port and, thus, reduces or eliminates the reprogramming risk. Further, with the components inside the PUF, the aspects herein need not provide foundry workers information about the PUF. The PUF device, even with the differences above, can have many challenge/response pairs because of the large number of bits stored in the OTP.

Thus, the PUF device herein provides a reliable way to generate multiple signatures as challenge and response pairs for use in security functions. The PUF herein has enough entropy (randomness) between each PUF to warrant uniqueness. Finally, the PUF is secure against re-programming attacks and against "cold-boot" attacks.

Aspects of the present disclosure include a method of generating a security key for an integrated circuit device, comprising: generating a plurality of key bits with a random number generator; storing the plurality of key bits in a nonvolatile memory; and generating a security key from the stored plurality of key bits.

Another aspect of the present disclosure includes an integrated circuit device with a PUF generator configured to output two or more security keys, each security key comprising a plurality of key bits, wherein the PUF generator comprises: a static random access memory (SRAM) that is read, after initialization, to provide one or more of the plurality of key bits; an one-time programmable (OTP) device to: store the bits read from the SRAM controller; and provide one of the two or more the security keys upon receiving an address.

Another aspect of the present disclosure includes a system for generating an integrated circuit device security key that may have a random number generator comprising: a static random access memory (SRAM) that is read, after initialization, to provide a plurality of bits; a liner-feedback shift register (LFSR) to scramble the plurality of bits read from the SRAM; an input address scrambler to: receive an input address; scramble the input address into a scrambled address; provide the scrambled address; an one-time programmable (OTP) device in communication with the LFSR and the input address scrambler to: store the scrambled bits, provided from the LFSR; associate the scrambled bits with an address; receive the scrambled address from the input address scrambler; determine the address, associated with the scrambled bits, which matches the scrambled address; read the scrambled bits having the address that matches the scrambled address; provide the scrambled bits as the security key; an output register in communication with the OTP device, the output register to: receive the security key from the OTP device; and output the security key.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A non-transitory computer-readable medium including contents that are configured to cause a computing system to generate a security key for an integrated circuit device, the method comprising:
    generating a plurality of key bits with a random number generator;
    storing the plurality of key bits in a nonvolatile memory that comprises a one-time programmable (OTP) device;
    generating the security key from the plurality of key bits stored in the nonvolatile memory; and
    locking the OTP device after storing the plurality of key bits, wherein a lock bit is set in the OTP device to indicate that the OTP device is locked, wherein, after the lock bit is set, the OTP device does not store additional bits.

2. The non-transitory computer-readable medium of claim 1, wherein the random number generator comprises a static random access memory (SRAM), wherein the plurality of key bits are read from the SRAM after initialization of the SRAM.

3. The non-transitory computer-readable medium of claim 2, wherein the random number generator further comprises a scrambler that scrambles the plurality of key bits that are read from the SRAM.

4. The non-transitory computer-readable medium of claim 3, wherein the scrambler is one of a bit-folding circuit or a linear-feedback shift register.

5. The non-transitory computer-readable medium of claim 1, wherein the plurality of key bits are stored into the OTP device, and wherein the plurality of key bits represent two or more security keys.

6. The non-transitory computer-readable medium of claim 1, wherein the OTP device receives an address and retrieves the security key associated with the address.

7. The non-transitory computer-readable medium of claim 6, wherein the address is scrambled before being provided to the OTP device.

8. The non-transitory computer-readable medium of claim 6, further comprising:
    receiving a key size indicator; and
    setting a key size for the security key according to the key size indicator.

9. A non-transitory computer-readable medium including contents that are configured to cause a computing system to carry out a method for generating a security key for an integrated circuit device, the method comprising:
    generating a plurality of key bits with a random number generator comprising a SRAM;
    storing the plurality of key bits in a nonvolatile memory comprising a one time programmable (OTP) device; and generating the security key from the plurality of key bits stored in the nonvolatile memory,
wherein the SRAM stores fewer bits than the OTP device, and the SRAM is initialized two or more times to provide the plurality of key bits to the OTP device.

10. The non-transitory computer-readable medium of claim 9, wherein the random number generator comprises a static random access memory (SRAM), wherein the plurality of key bits are read from the SRAM after initialization of the SRAM.

11. The non-transitory computer-readable medium of claim 10, wherein the random number generator further comprises a scrambler that scrambles the plurality of key bits that are read from the SRAM.

12. The non-transitory computer-readable medium of claim 11, wherein the scrambler is one of a bit-folding circuit or a linear-feedback shift register.

13. The non-transitory computer-readable medium of claim 9, wherein the plurality of key bits are stored into the OTP device, and wherein the plurality of key bits represent two or more security keys.

14. The non-transitory computer-readable medium of claim 9, wherein the OTP device receives an address and retrieves the security key associated with the address.

15. The non-transitory computer-readable medium of claim 14, wherein the address is scrambled before being provided to the OTP device.

16. The non-transitory computer-readable medium of claim 14, further comprising:
receiving a key size indicator; and
setting a key size for the security key according to the key size indicator.

17. The non-transitory computer-readable medium of claim 14, further comprising:
outputting the security key in response to receiving the address.

18. The non-transitory computer-readable medium of claim 9, further comprising:
determining if the lock bit is set.

19. A one-time programmable (OTP) device in communication with a liner-feedback shift register (LFSR) and an input address scrambler, the OTP device configured to:
store a set of scrambled key bits provided from the LFSR;
associate the scrambled key bits with an address;
receive a scrambled address from the input address scrambler;
determine the address, associated with the scrambled key bits, which matches the scrambled address;
read the scrambled key bits having the address that matches the scrambled address; and
provide the scrambled key bits as the security key.

20. The OTP device of claim 19 further comprising a controller to:
control functions of an SRAM and the OTP device;
receive a key size indicator signal; and
set the output register to store a number of bits in accordance with the key size indicator signal for the security key.

* * * * *